(12) United States Patent
Kavulya et al.

(10) Patent No.: US 12,198,378 B2
(45) Date of Patent: *Jan. 14, 2025

(54) TECHNOLOGIES FOR FUSING DATA FROM MULTIPLE SENSORS TO IMPROVE OBJECT DETECTION, IDENTIFICATION, AND LOCALIZATION

(71) Applicant: Intel Corporation, Santa Clara, CA (US)

(72) Inventors: Soila Kavulya, Hillsboro, OR (US); Rita Chattopadhyay, Chandler, AZ (US); Monica Lucia Martinez-Canales, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,424

(22) Filed: Dec. 4, 2023

(65) Prior Publication Data

US 2024/0127478 A1 Apr. 18, 2024

Related U.S. Application Data

(63) Continuation of application No. 17/561,478, filed on Dec. 23, 2021, now Pat. No. 11,887,335, which is a continuation of application No. 16/232,147, filed on Dec. 26, 2018, now Pat. No. 11,423,570.

(51) Int. Cl.
*G06T 7/73* (2017.01)

(52) U.S. Cl.
CPC ............... *G06T 7/74* (2017.01); *G06T 7/73* (2017.01); *G06T 2200/04* (2013.01); *G06T 2207/10028* (2013.01)

(58) Field of Classification Search
CPC ......... G06T 7/74; G06T 7/73; G06T 2200/04; G06T 2207/10028
USPC .......................................................... 382/103
See application file for complete search history.

(56) References Cited

U.S. PATENT DOCUMENTS

| 6,144,896 | A | 11/2000 | Kask et al. |
|---|---|---|---|
| 10,133,951 | B1 | 11/2018 | Mendonca et al. |
| 10,510,154 | B2 | 12/2019 | Chattopadhyay et al. |
| 10,558,897 | B2 | 2/2020 | Sharma et al. |

(Continued)

FOREIGN PATENT DOCUMENTS

KR 1020170048108 A 5/2017

OTHER PUBLICATIONS

Duraisamy, Bharanidhar, et al.; "Track Level Fusion of Extended Objects from Heterogeneous Sensors," 2016 19th International Conference on Information Fusion (FUSION), Jul. 2016; 10 pages.

(Continued)

*Primary Examiner* — Stephen P Coleman
(74) *Attorney, Agent, or Firm* — Alliance IP, LLC

(57) ABSTRACT

Technologies for performing sensor fusion include a compute device. The compute device includes circuitry configured to obtain detection data indicative of objects detected by each of multiple sensors of a host system. The detection data includes camera detection data indicative of a two or three dimensional image of detected objects and lidar detection data indicative of depths of detected objects. The circuitry is also configured to merge the detection data from the multiple sensors to define final bounding shapes for the objects.

20 Claims, 7 Drawing Sheets

(56) References Cited

U.S. PATENT DOCUMENTS

| | | |
|---|---|---|
| 2002/0114535 A1 | 8/2002 | Luo |
| 2003/0234866 A1 | 12/2003 | Cutler |
| 2012/0002852 A1 | 1/2012 | Karasikov et al. |
| 2013/0039409 A1 | 2/2013 | Gupta |
| 2013/0093842 A1 | 4/2013 | Yahata |
| 2014/0093131 A1 | 4/2014 | Fan et al. |
| 2015/0036870 A1 | 2/2015 | Mundhenk et al. |
| 2015/0248591 A1 | 9/2015 | Shi et al. |
| 2015/0324658 A1 | 11/2015 | Zhang et al. |
| 2017/0320437 A1 | 11/2017 | Liebau et al. |
| 2018/0047193 A1 | 2/2018 | Gao et al. |
| 2018/0343388 A1 | 11/2018 | Matsushita |
| 2019/0049560 A1 | 2/2019 | Chattopadhyay et al. |
| 2019/0050692 A1 | 2/2019 | Sharma et al. |
| 2019/0051006 A1 | 2/2019 | Chattopadhyay et al. |
| 2019/0353774 A1* | 11/2019 | Chondro ............... G01S 17/86 |

OTHER PUBLICATIONS

Hosang, Jan et al., "Learning Non-Maximum Suppression," Proceedings of the IEEE Conference on Computer Vision and Pattern Recognition (CVPR), 2017, pp. 4507-4515 (9 pages).

Kumar, Praveen, et al., "Addressing Uncertainty in Multi-Modal Fusion for Improved Object Detection in Dynamic Environment," Information Fusion 11; 2010; 14 pages.

PCT International Search Report and Written Opinion issued in PCT/US2019/061955, dated Mar. 10, 2020; 8 pages.

U.S. Appl. No. 17/561,478, filed Dec. 23, 2021 and entitled Technologies for Fusing Data From Multiple Sensors to Improve Object Detection, Identification, and Localization (28 pages).

Wikipedia, "Occupancy Grid Mapping," retrieved online at https://en.wikipedia.org/w/index.php?title=Occupancy_grid_mapping&oldid=842429132 on Jan. 13, 2021 (3 pages).

* cited by examiner

Relative Weights of the Sensors under Different Contexts

| Sensors | Day | Night | Nearer Range/ Lower elevation | Far ranges | police siren, ambulance, firetruck, explosion | Tunnel | Road condition (vibration sensors) | Rain/Fog/Snow | Fire hazards on the road/ Forest fire | Glare/ Shadows |
|---|---|---|---|---|---|---|---|---|---|---|
| LiDAR | | H | H | | | | | | | |
| Camera | H | | H | H | | H | | | | H |
| Radar | | | | H | | | | H | H | H |
| Acoustic | | | | | H | | | H | | |

FIG. 7

TECHNOLOGIES FOR FUSING DATA FROM MULTIPLE SENSORS TO IMPROVE OBJECT DETECTION, IDENTIFICATION, AND LOCALIZATION

CROSS-REFERENCE TO RELATED APPLICATIONS

This Application is a continuation (and claims the benefit of priority under 35 U.S.C. § 120) of U.S. patent application Ser. No. 17/561,478 filed on Dec. 23, 2021, and entitled TECHNOLOGIES FOR FUSING DATA FROM MULTIPLE SENSORS TO IMPROVE OBJECT DETECTION, IDENTIFICATION, AND LOCALIZATION, which application is a continuation of U.S. patent application Ser. No. 16/232,147, filed Dec. 26, 2018 and issued as U.S. Pat. No. 11,423,570 on Aug. 23, 2022. The disclosures of the prior Applications are considered part of and are incorporated by reference in their entirety in the disclosure of this Application.

BACKGROUND

Efficient and robust sensing of objects in an environment is of high importance to automated systems such as robots, drones, and autonomous vehicles. State of the art systems typically include three functional processes: detection of an object (e.g., determining that an object exists), recognition (e.g., determining what the object is), and localization (e.g., determining where the object is). In performing these operations, state of the art systems typically exhibit several shortcomings, including incorrect reconciliation of detections based on rejection of bounding box proposals from multiple sensors, detection but not recognition of objects within cells, and incorrect localization based on conducting the merging of detection data in two dimensional space.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 7 is a chart of at least one embodiment of a set of relative weights that may be applied by the system of FIG. 1 to sensor data when performing sensor fusion.

DETAILED DESCRIPTION

Figure 1:
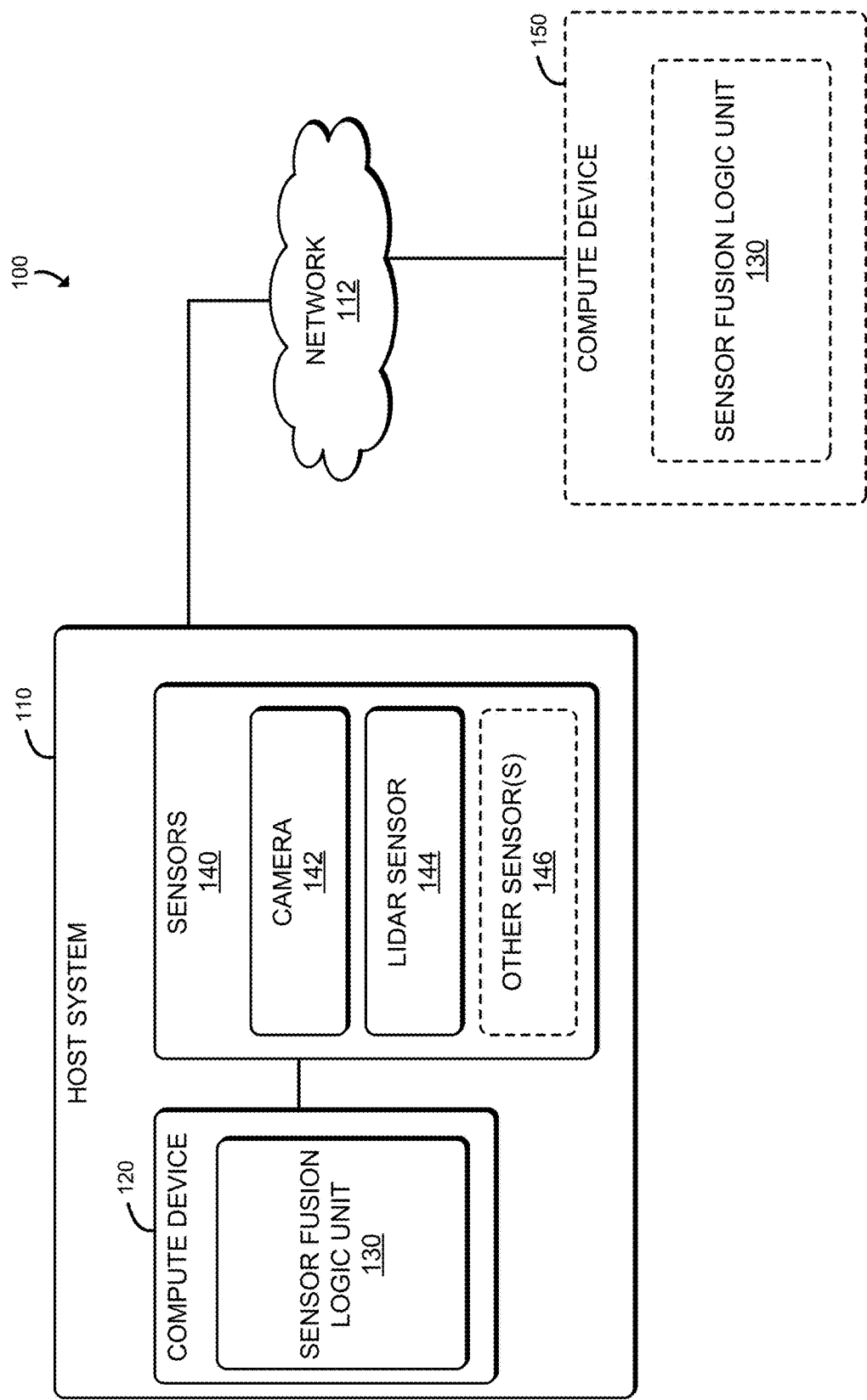
FIG. 1 is a simplified diagram of at least one embodiment of a system for fusing data from multiple sensors for object detection, identification, and localization.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for performing sensor fusion includes a host system 110, which may be embodied as any device or assembly of devices (e.g., an autonomous vehicle, a drone, a robot, etc.) configured to identify objects in an environment around the host system 110 and potentially respond to the presence of the objects (e.g., avoid a collision with a pedestrian crossing a street, stop at a stop sign, etc.). In the illustrative embodiment, the host system 110 includes a compute device 120 that includes a sensor fusion logic unit 130 which may be embodied as any device or circuitry (e.g., a processor, a field programmable gate array (FPGA), an application specific integrated circuit (ASIC), etc.) configured to receive detection data from a set of sensors 140 of the host system 110 and merge the detection data to define bounding shapes (e.g., shapes having boundaries that enclose an object) detected by the different sensors 140. In the illustrative embodiment, the sensors 140 include a camera 142, which may be embodied as any device or circuitry (e.g., one or more lenses adapted to direct light into an electronic sensor, such as a charge-coupled device) configured to convert light (e.g., light in a visible spectrum) to pixel information (e.g., sets of color values for each of multiple x and y coordinates in a two dimensional frame, or x, y and z coordinates in a three dimensional frame using 3D cameras such as Intel RealSense™ Depth cameras). Additionally, in the illustrative embodiment, the sensors 140 include a lidar sensor 144 which may be embodied as any device or circuitry configured to illuminate a target objects with pulsed laser light and measure reflected pulses from the target objects to determine the positions of the target objects relative to the lidar sensor 144 in a three dimensional coordinate system (e.g., x, y, and z coordinates). As such, the lidar sensor 144 provides depth information, which may not be provided by the camera 142.

The sensors 140 may also include one or more other sensors 146 (e.g., a radar sensor to determine the range of objects using radio waves, an acoustic sensor to detect sounds in the environment, a multispectral or hyperspectral image sensor to differentiate between types of objects using their electromagnetic spectrum, etc.). In performing the sensor fusion, the sensor fusion logic unit 130, in the illustrative embodiment, selectively applies different weights to the data received from the sensors 140 (e.g., the camera 142 and lidar sensor 144) as a function of a context in which the data was obtained (e.g., weather, amount of available light in the environment, etc.) and known attributes of the corresponding sensors 140 (e.g., the camera 142 is less reliable in relatively dark environments compared to the lidar sensor 144). Furthermore, the sensor fusion logic unit 130 applies one or more rules, which may be user-defined or otherwise configurable (e.g., in updates from a manufacturer), that produce degrees of belief that object detections represented in the data from the various sensors 140 represent the same object, different objects, or unoccupied space ("free space"). Further, the sensor fusion logic unit 130 determines whether to merge (e.g., fuse) bounding boxes representing objects in the data from different sensors 140 to define a resulting bounding shape or to leave certain bounding boxes separate. In some embodiments, a compute device 150 located remotely from the host system 110 may receive the sensor data (e.g., through a network 112), perform the sensor fusion operations, and provide data indicative of the bounding shapes to the host system 110 (e.g., to the compute device 120) for analysis. As compared to state of the art systems, which may (i) perform non-maximum suppression (e.g., keep one overlapping bounding box and discard the rest of the overlapping bounding boxes), (ii) execute occupancy-grid object detection (e.g., determine whether each cell in a grid is occupied by an object, but potentially fail to identify distinct objects in an environment), and/or (iii) attempt to merge detected objects based only on two dimensional information (e.g., without depth information), the system 100 is more efficient and reliable at performing object detection, identification, and localization.

Figure 2:
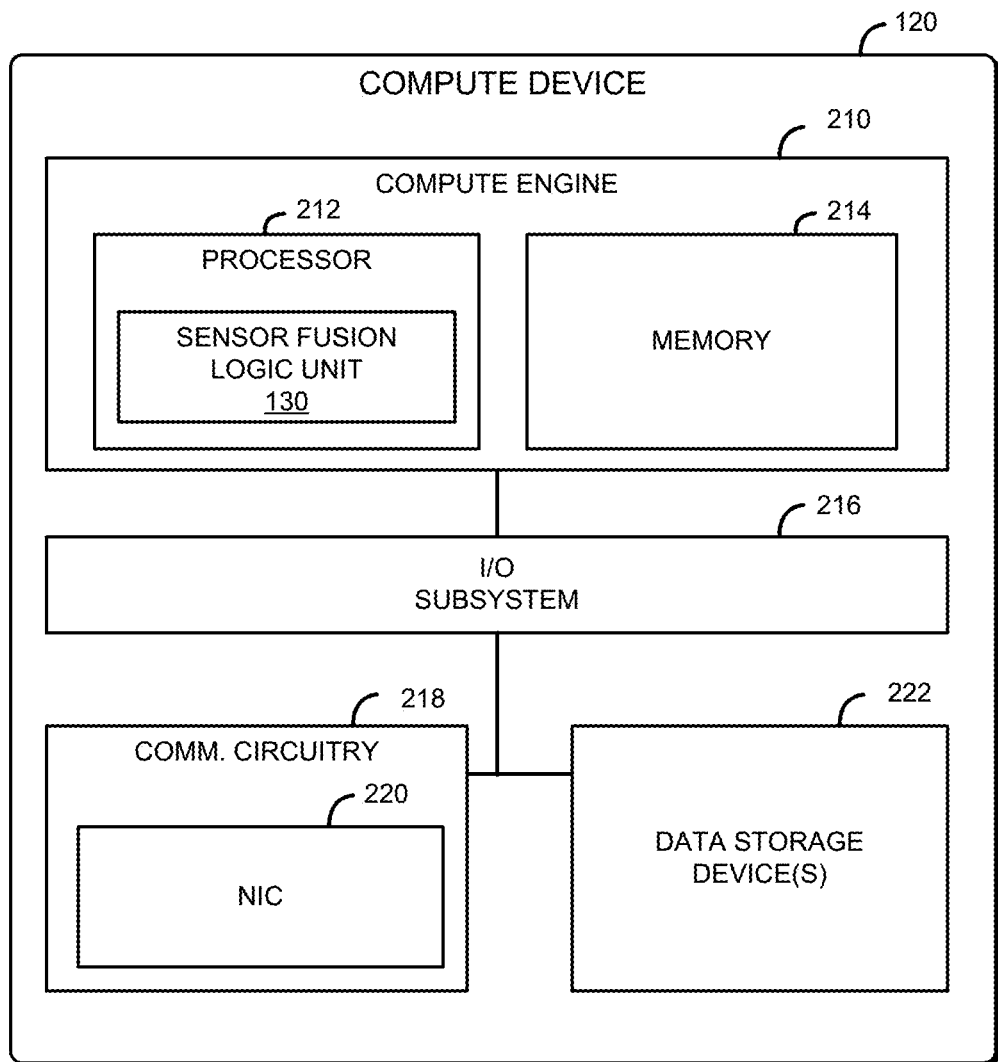
FIG. 2 is a simplified block diagram of at least one embodiment of a compute device included in the system of FIG. 1.

Referring now to FIG. 2, the illustrative compute device 120 includes a compute engine (also referred to herein as "compute engine circuitry") 210, an input/output (I/O) subsystem 216, communication circuitry 218, and one or more data storage devices 222. Of course, in other embodiments, the compute device 120 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212 and a memory 214. The processor 212 may be embodied as any type of processor capable of performing the functions described herein. For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein. In the illustrative embodiment, the processor 212 includes the sensor fusion logic unit 130, described with reference to FIG. 1. However, in other embodiments, the sensor fusion logic unit 130 may be located elsewhere in the compute device 120 (e.g., not integrated into the processor 212).

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as applications, libraries, and drivers.

The compute engine 210 is communicatively coupled to other components of the compute device 120 via the I/O subsystem 216, which may be embodied as circuitry and/or components to facilitate input/output operations with the compute engine 210 (e.g., with the processor 212 and/or the main memory 214) and other components of the compute device 120 and other devices (e.g., the sensors 140). For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the compute device 120, into the compute engine 210.

The communication circuitry 218 may be embodied as any communication circuit, device, or collection thereof, capable of enabling communications over the network 112 between the compute device 120 and another device (e.g., the compute device 150, etc.). The communication circuitry 218 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the compute device 120 to connect with another compute device (e.g., the compute device 150, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the compute device 120 at the board level, socket level, chip level, and/or other levels.

Each data storage device 222, may be embodied as any type of device configured for short-term or long-term storage of data such as, for example, memory devices and circuits, memory cards, hard disk drives, solid-state drives, or other data storage device. Each data storage device 222 may include a system partition that stores data and firmware code for the data storage device 222 and one or more operating system partitions that store data files and executables for operating systems.

The compute device 150 may have components similar to those described in FIG. 2 with reference to the compute device 120. The description of those components of the compute device 120 is equally applicable to the description of components of the compute device 150. Further, it should be appreciated that any of the compute devices 120, 150 may include other components, sub-components, and devices commonly found in a computing device, which are not discussed above in reference to the compute device 120 and not discussed herein for clarity of the description.

As described above, the compute devices 120, 150 are illustratively in communication via the network 112, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), a radio area network (RAN), digital subscriber line (DSL) networks, cable networks (e.g., coaxial networks, fiber networks, etc.), or any combination thereof.

Figure 3:
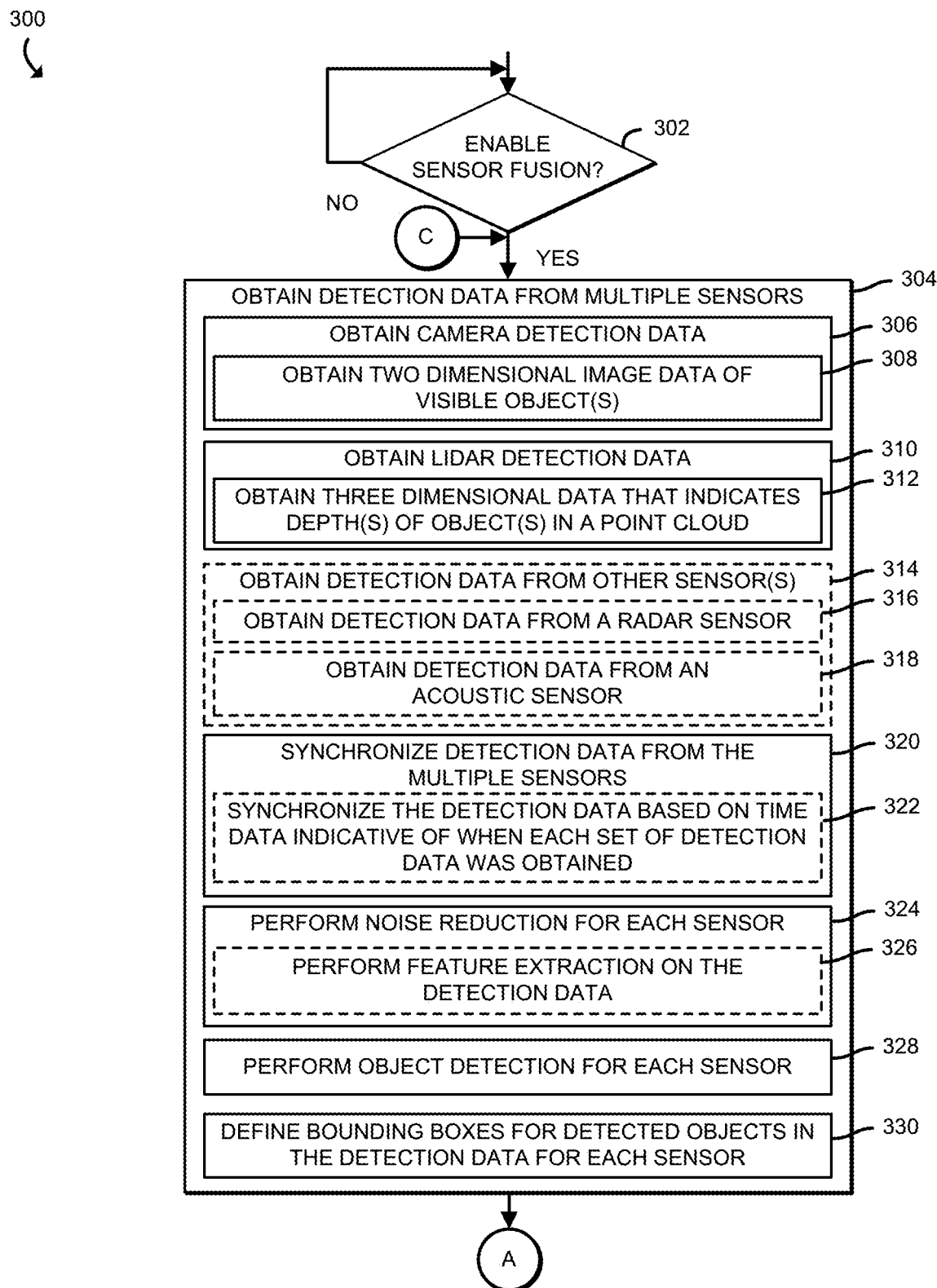
FIGS. 3-5 are simplified block diagrams of at least one embodiment of a method for fusing data from multiple sensors that may be performed by a compute device of the system of FIG. 1.
Figure 6:
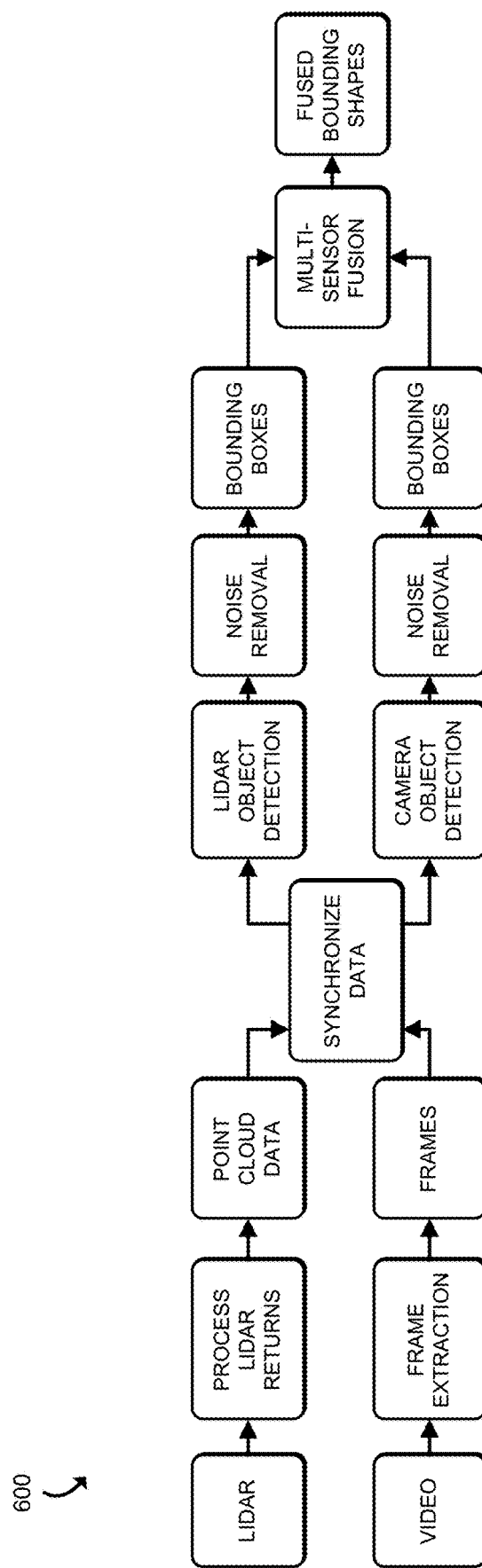
FIG. 6 is a simplified diagram of at least one embodiment of a pipeline for performing sensor fusion with the system of FIG. 1.

Referring now to FIG. 3, the compute device 120, in operation, may execute a method 300 for fusing data from multiple sensors. The method 300 is also illustrated as a pipeline 600 in FIG. 6. The method 300 begins with block 302, in which the compute device 120 determines whether to enable sensor fusion. In making the determination, the compute device 120 may determine whether a configuration setting (e.g., stored in a configuration file in the data storage device 222) indicates that sensor fusion should be enabled, whether the sensor fusion logic unit 130 is operable and in communication with the sensors 140, and/or based on other factors. Regardless, in response to a determination to enable sensor fusion, the method 300 advances to block 304, in which the compute device 120 obtains detection data from multiple sensors (e.g., the sensors 140). The detection data may be embodied as any data provided by a corresponding sensor 140 and indicative of the presence of one or more objects in an environment of the host system 110. In doing so, the compute device 120 may obtain camera detection data (e.g., from the camera 142), as indicated in block 306. In the illustrative embodiment, in obtaining the camera detection data, the compute device 120 obtains two or three dimensional image data of one or more visible objects, as indicated in block 308. Additionally, in the illustrative embodiment, the compute device 120 obtains lidar detection data (e.g., from the lidar sensor 144), as indicated in block 310. In doing so, in the illustrative embodiment, the compute device 120 obtains three dimensional data that indicates the depth (e.g., in addition to x and y coordinates) of each of one or more objects in an environment of the host system 110, as indicated in block 312. In the illustrative embodiment, the lidar detection data may be embodied as a point cloud (e.g., a set of points in three dimensional space representing positions in the environment where laser pulses were reflected back to the lidar sensor 144).

As indicated in block 314, the compute device 120 may additionally obtain detection data from one or more other sensors 146. For example, the compute device 120 may obtain detection data from a radar sensor, as indicated in block 316 and/or from an acoustic sensor, as indicated in block 318. Regardless, in the illustrative embodiment, the compute device 120 synchronizes the detection data from the multiple sensors 140, as indicated in block 320. In doing so, in the illustrative embodiment, the compute device 120 synchronizes the detection data received from each sensor 140 based on time data indicative of when each set of detection data was obtained (e.g., by each corresponding sensor 140), as indicated in block 322. For example, the detection data from each sensor 140 may include a time stamp (e.g., any data indicative of the time when the detection data was produced by the corresponding sensor 140) and the compute device 120 may associate detection data from each sensor 140 with a corresponding moment in time (e.g., a given time, plus or minus a predefined amount of time), referred to herein as a frame. The compute device 120, in the illustrative embodiment, also removes noise from the obtained detection data (e.g., on a sensor-by-sensor basis), such as by performing feature extraction, as indicated in blocks 324 and 326. Further, the compute device 120, in the illustrative embodiment, performs object detection using the extracted features for each sensor 140, as indicated in block 328, and defines bounding boxes (e.g., rectangles that enclose the detected objects) for the detected objects in the detection data, as indicated in block 330. Subsequently, the method 300 advances to block 332 of FIG. 4, in which the compute device 120 merges (e.g., fuses) the detection data from the multiple sensors 140 to define final bounding shapes.

Figure 4:
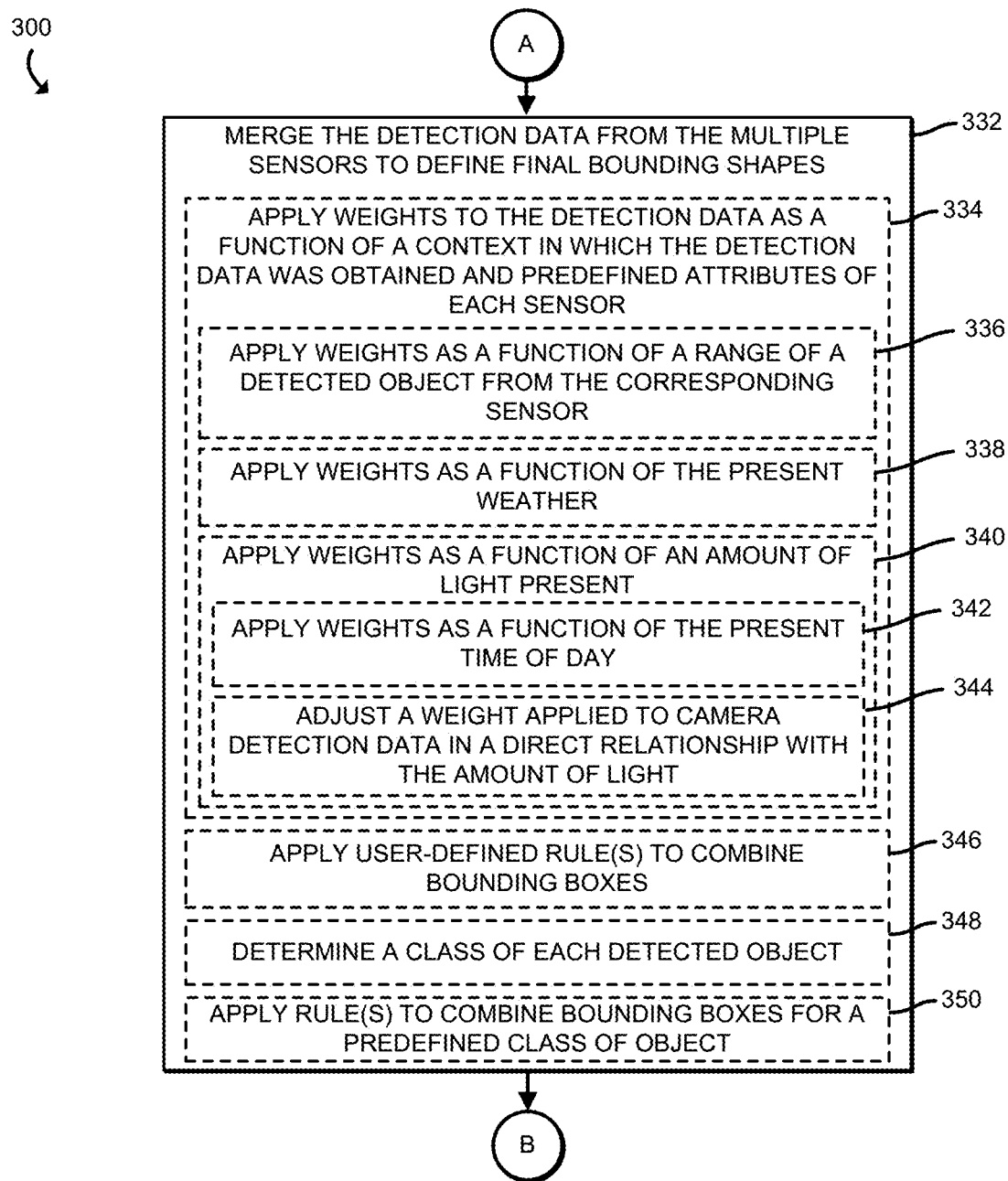

Referring now to FIG. 4, in merging the detection data from the multiple sensors 140, the compute device 120, in the illustrative embodiment, applies weights (e.g., numerical factors that selectively increase or decrease the significance of the detection data from a given sensor 140 to the total set of detection data from the sensors 140), as indicated in block 334. In doing so, and as indicated in block 336, the compute device 120 may apply the weights as a function of a range of a detected object from the corresponding sensor 140. For example, and as indicated in the chart 700 of FIG. 7, in which an 'H' represents a relatively heavy weight being applied to the detection data from the corresponding sensor 140, if the object is relatively near the host system 110 (e.g., less than a predefined distance), the detection data from the lidar sensor 144 may be more heavily weighted relative to sensor data from the camera 142 or other sensors 146. Conversely, if the object is relatively far away (e.g., greater than or equal to the predefined distance), the compute device 120 may apply a heavier weight to the detection data from the camera 142 than to the detection data from the lidar sensor 144. As indicated in block 338, the compute device 120 may apply weights as a function of the present weather in the environment of the host system 110. For example, in rain, fog, or snow, the compute device 120 may apply heavier weights to detection data from a radar sensor or acoustic sensor than to detection data from the camera 142 or the lidar sensor 144. As another example, and as indicated in block 340, the compute device 120 may apply weights as a function of the amount of light present in the environment. In doing so, the compute device 120 may determine the amount of weight to apply to the detection data from a given sensor 140 as a function of the time of day when the detection data was obtained, as indicated in block 342. As shown in the chart 700, the compute device 120 may apply a greater (e.g., heavier) weight the detection data from the camera 142 in the day time and lesser weight to the detection data from the camera 142 in the night time. As indicated in block 344, the compute device 120 may adjust the amount of weight applied to the detection data from the camera in a direct relationship with the amount of light present (e.g., as the amount of light increases, the weight applied to the detection data from the camera increases correspondingly). As indicated in block 346, in addition to selectively applying different weights to the detection data from the different sensors 140, the compute device 120 may also apply user-defined rules (e.g., stored in a data storage device 222 or present in the memory 214) that define how to combine bounding boxes (e.g., the bounding boxes from block 330 of FIG. 3) associated with the detection data from the various sensors 140. As indicated in block 348, the compute device 120 may determine a class of each detected object (e.g., a pedestrian, a vehicle, etc.) and, as indicated in block 350, may apply one or more rules for combining bounding boxes that are specific to a predefined class of object (e.g., a specific rule for combining bounding boxes associated with vehicles).

Figure 5:
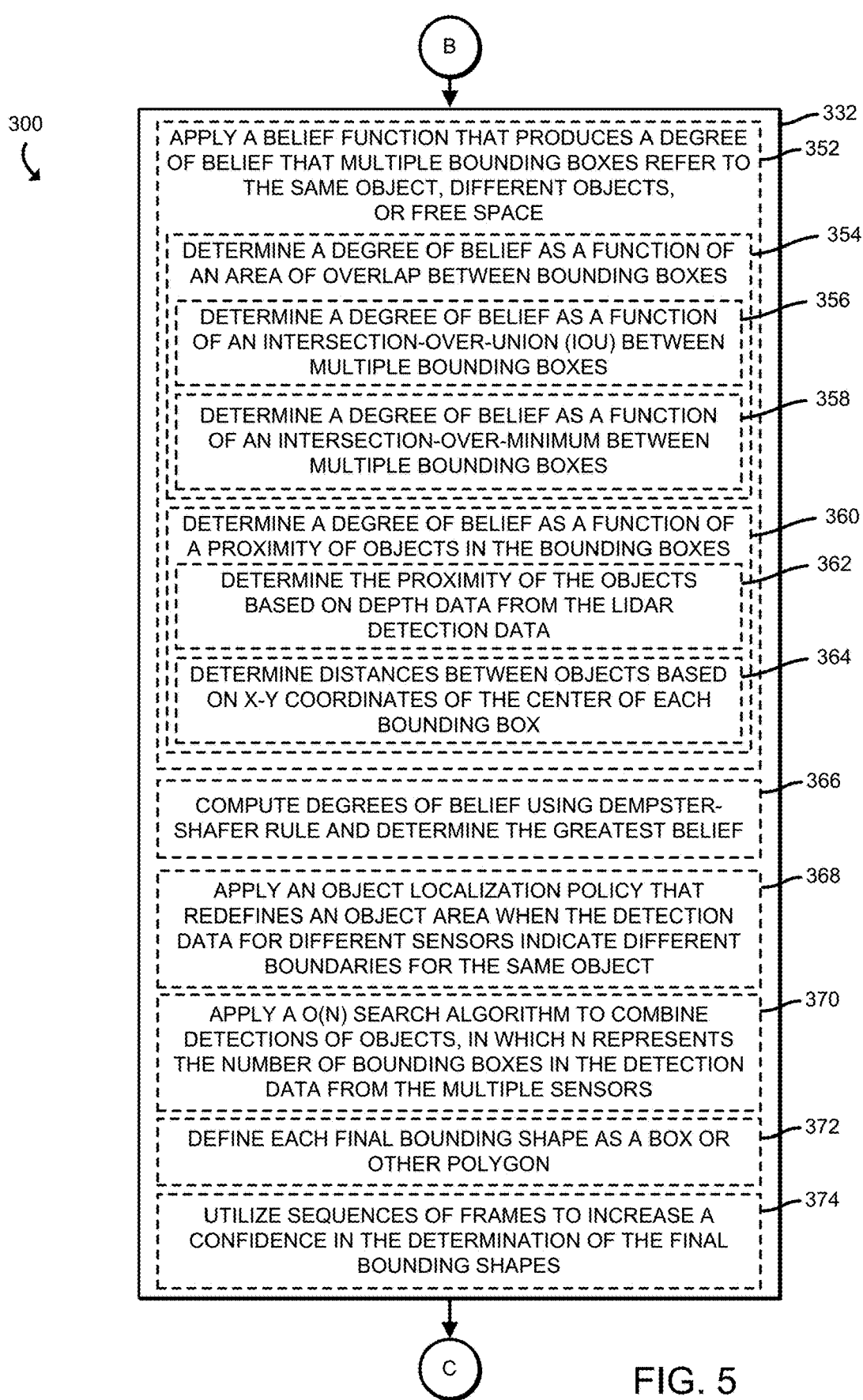

Referring now to FIG. 5, in merging the detection data, the compute device 120 may apply a belief function that produces a degree of belief that multiple bounding boxes (e.g., bounding boxes present in the detection data from multiple sensors 140) refer to the same object, different objects, or free space, as indicated in block 352. In doing so, the compute device 120 may determine a degree of belief as a function of an area of overlap between multiple bounding boxes, as indicated in block 354. For example, the compute device may determine a degree of belief as a function of an intersection-over-union (IOU) between multiple bounding boxes, as indicated in block 356. The compute device 120 may determine the IOU by calculating the area of intersection between the bounding boxes, divided by the area of the union of the bounding boxes. In the illustrative embodiment, the compute device 120 determines a degree of belief that multiple bounding boxes represent the same object, a related degree of belief that the bounding boxes represent different objects, and a degree of belief that the bounding boxes are associated with free space, represented by a false positive rate. Table 1, below, illustrates an embodiment of the calculations made by the compute device 120 to determine each corresponding degree of belief:

TABLE 1

IOU Degrees of Belief Calculations.

| Hypothesis | Degree of Belief |
| --- | --- |
| Same Object | (1 − FalsePositiveRate) * iou(box$_1$, box$_2$) |
| Different Object | (1 − FalsePositiveRate) * (1 − iou(box$_1$, box$_2$)) |
| Free Space | FalsePositiveRate |

The compute device 120 may additionally or alternatively determine a degree of belief as a function of an intersection-over-minimum (IOM) between multiple bounding boxes, as indicated in block 358. For example, in the illustrative embodiment, the compute device 120 may determine one or more degrees of belief based on an IOM if the object associated with the bounding boxes has been determined to be a vehicle, as the IOM is particularly useful in correcting lidar detection data, which may include multiple relatively small bounding boxes for a single vehicle (e.g., as a result of the lidar's laser pulses penetrating the windows of the vehicle). Table 2, below, illustrates an embodiment of the calculations made by the compute device 120 to determine each degree of belief (e.g., same object, different object, and free space):

TABLE 2

IOM Degrees of Belief Calculations.

| Hypothesis | Degree of Belief |
|---|---|
| Same Object | (1 − FalsePositiveRate) * iom(box$_1$, box$_2$) |
| Different Object | (1 − FalsePositiveRate) * (1 − iom(box$_1$, box$_2$)) |
| Free Space | FalsePositiveRate |

As indicated in block 360, the compute device 120 may determine a degree of belief as a function of a proximity of objects in multiple bounding boxes to each other. Determining the degree of belief based on proximity of objects to each other is particularly useful in detecting distinct objects in crowded scenes. In doing so, the compute device 120 may determine the proximity of the objects based on depth data from the lidar detection data or from the 3D camera detection data (e.g., by determining differences in the depths of different bounding boxes), as indicated in block 362. Alternatively, the compute device 120 may determine distances between objects based on x-y coordinate pairs representing the center of each bounding box, as indicated in block 364. An example function, given in Equation 1 below, for calculating a degree of belief (a "proximity mass") using proximity may utilize a depth threshold (T) that specifies a minimum separation between two distinct objects, where depth is the distance from the host system 110 as measured by the lidar sensor 144.

$$ProximityMass = \max\left(\frac{abs(depth_1, depth_2)}{T}, 1.0\right) \quad \text{(Equation 1)}$$

Corresponding degrees of belief for a hypothesis that multiple bounding boxes represent the same object, a hypothesis that the multiple bounding boxes represent different objects, or that the bounding boxes represent free space are given below in Table 3. The result may also be unknown, as indicated below.

TABLE 3

Proximity Degrees of Belief Calculations.

| Hypothesis | Degree of Belief |
|---|---|
| Same Object | (1 − FalsePositiveRate) * 1 − ProximityMass |
| Different Object | (1 − FalsePositiveRate) * ProximityMass |
| Free Space | FalsePositiveRate |
| Unknown | 1.0 if (depth$_1$ or depth$_2$ is undefined) |

In the illustrative embodiment, the compute device 120 calculates degrees of belief using the Dempster-Shafer rule (e.g., calculating a degree of belief for different possible hypotheses) and determines which hypothesis has the greatest degree of belief (e.g., that the bounding boxes represent the same object, that the bounding boxes represent different objects, etc.), as indicated in block 366. As indicated in block 368, the compute device 120 may apply an object localization policy that redefines an object area when the detection data for different sensors indicate different boundaries for the same object. In the illustrative embodiment, and as indicated in block 370, the compute device 120 may perform a search algorithm (e.g., an O(N) algorithm, in which N represents a number of bounding boxes in the detection data and k represents the neighborhood or localization distance for the search) to determine whether to fuse (e.g., merge) bounding boxes. In doing so, the compute device 120 may perform an initialization operation in which the compute device 120 sets a reconciled combined detections list (d) to an empty list. Further, the compute device 120 may sort the bounding boxes from the detection data of the multiple sensors (e.g., sorting the bounding boxes by their x-axis values). Additionally, the compute device 120 may perform a set of operations for each bounding box, s, in the list of sorted boxes, as follows: (i) compute degrees of belief (e.g., masses) using different sensor fusion policies for each bounding box, s, and bounding boxes in combined detections, t, that are within a localization distance (e.g., a predefined distance representing the neighborhood of the objects); (ii) combine masses using the Dempster-Shafer rule and compute the maximum belief; (iii) if the maximum belief is that the bounding boxes refer to the same object, then fuse (e.g., merge) the bounding boxes, s and t. Otherwise, add bounding box, s, as a distinct object in the list of reconciled combined detections, d. In defining a final bounding shape (e.g., from fusing multiple bounding boxes together), the compute device 120 may define the final bounding shape as a box or other polygon (e.g., a non-rectangular polygon), as indicated in block 372. In some embodiments, the compute device 120 may utilize sequences of frames (e.g., detection data from each of multiple sequential moments in time) to increase a confidence in the determination of the final bounding shapes, as indicated in block 374. Afterwards, the method 300 loops back to block 302, in which the compute device 120 determines whether to continue to perform sensor fusion. It should be understood that the compute device 120 may perform other operations, including determining responsive actions that the host system 110 should take based on an identification of a particular object in the environment, which are not shown in the method 300. Further, it should be understood that while the method 300 has been shown in a particular sequence, the compute device 120 may perform operations in the method 300 in a different order and/or concurrently (e.g., in parallel). Additionally, and as discussed with reference to FIG. 1, a remote compute device (e.g., the compute device 150) in communication with the host system 110 (e.g., through the network 112) may perform one or more of the operations of the method 300 instead of, or in cooperation with, the compute device 120.

EXAMPLES

Illustrative examples of the technologies disclosed herein are provided below. An embodiment of the technologies may include any one or more, and any combination of, the examples described below.

Example 1 includes a compute device comprising circuitry to obtain detection data indicative of objects detected by one or more sensors of a host system, wherein the detection data includes camera detection data indicative of at least one of a two or three dimensional image of detected objects and lidar detection data indicative of depths of detected objects; and merge the detection data from the multiple sensors to define final bounding shapes for the detected objects.

Example 2 includes the subject matter of Example 1, and wherein to merge the detection data from the one or more sensors comprises to apply weights to the detection data as a function of a context in which the detection data was obtained.

Example 3 includes the subject matter of any of Examples 1 and 2, and wherein to apply weights to the detection data comprises to apply weights as a function of a range of a detected object from the corresponding sensor.

Example 4 includes the subject matter of any of Examples 1-3, and wherein to apply weights to the detection data comprises to apply weights as a function of a present weather in an environment of the host system.

Example 5 includes the subject matter of any of Examples 1-4, and wherein to apply weights to the detection data comprises to apply weights as a function of an amount of light present in an environment of the host system.

Example 6 includes the subject matter of any of Examples 1-5, and wherein to apply weights to the detection data comprises to adjust a weight applied to the camera detection data in a direct relationship with the amount of light.

Example 7 includes the subject matter of any of Examples 1-6, and wherein to merge the detection data from the one or more sensors comprises to apply one or more user-defined rules to combine bounding boxes present in the detection data from each sensor.

Example 8 includes the subject matter of any of Examples 1-7, and wherein to merge the detection data from the one or more sensors comprises to determine a class of an object in the detection data; and apply a rule defined to combine bounding boxes for objects of the determined class.

Example 9 includes the subject matter of any of Examples 1-8, and wherein to merge the detection data from the one or more sensors comprises to apply a belief function that produces a degree of belief that multiple bounding boxes refer to the same object, different objects, or free space.

Example 10 includes the subject matter of any of Examples 1-9, and wherein to determine the degree of belief comprises to determine the degree of belief as a function of an intersection-over-union between multiple bounding boxes, determine the degree of belief as a function of an intersection-over-minimum between multiple bounding boxes, or determine a degree of belief as a function of a proximity of the objects to each other.

Example 11 includes the subject matter of any of Examples 1-10, and wherein to merge the detection data further comprises to determine whether the degree of belief that the multiple bounding boxes refer to the same object is greater than the degree of belief that the bounding boxes refer to the different objects and the degree of belief that the bounding boxes refer to free space, and merge, in response to a determination that the greatest belief is that the bounding boxes refer to the same object, the bounding boxes.

Example 12 includes the subject matter of any of Examples 1-11, and wherein to merge the bounding boxes comprises to define the final bounding shape as a polygon.

Example 13 includes one or more machine-readable storage media comprising a plurality of instructions stored thereon that, in response to being executed, cause a compute device to obtain detection data indicative of objects detected by each of one or more sensors of a host system, wherein the detection data includes camera detection data indicative of at least one of a two or three dimensional image of detected objects and lidar detection data indicative of depths of detected objects; and merge the detection data from the multiple sensors to define final bounding shapes for the detected objects.

Example 14 includes the subject matter of Example 13, and wherein to merge the detection data from the one or more sensors comprises to apply weights to the detection data as a function of a context in which the detection data was obtained.

Example 15 includes the subject matter of any of Examples 13 and 14, and wherein to apply weights to the detection data comprises to apply weights as a function of a range of a detected object from the corresponding sensor.

Example 16 includes the subject matter of any of Examples 13-15, and wherein to apply weights to the detection data comprises to apply weights as a function of a present weather in an environment of the host system.

Example 17 includes the subject matter of any of Examples 13-16, and wherein to apply weights to the detection data comprises to apply weights as a function of an amount of light present in an environment of the host system.

Example 18 includes the subject matter of any of Examples 13-17, and wherein to merge the detection data from the one or more sensors comprises to determine a class of an object in the detection data; and apply a rule defined to combine bounding boxes for objects of the determined class.

Example 19 includes a method comprising obtaining, by a compute device, detection data indicative of objects detected by one or more sensors of a host system, wherein the detection data includes camera detection data indicative of at least one of a two or three dimensional image of detected objects and lidar detection data indicative of depths of detected objects; and merging, by the compute device, the detection data from the multiple sensors to define final bounding shapes for the detected objects.

Example 20 includes the subject matter of Example 19, and wherein merging the detection data from the one or more sensors comprises applying weights to the detection data as a function of a context in which the detection data was obtained.

The invention claimed is:

1. At least one non-transitory machine-readable storage medium comprising instructions, which when executed by processor circuitry of a computing device, cause the processor circuitry to perform operations to:
   obtain sensor data representative of an environment of a vehicle, the sensor data including:
      camera data providing at least one image of an object in the environment, and lidar data providing depth information of the object in the environment;
   synchronize the sensor data based on timestamps indicating time of capture for the camera data and the lidar data;
   define, from the camera data obtained at the time of capture, a first bounding box for the object;
   define, from the lidar data obtained at the time of capture, a second bounding box for the object; and
   fuse, based at least partially on a parameter, the first bounding box and second bounding box to define a fused bounding shape of the object, wherein fusion of the first bounding box and second bounding box is based on a confidence value that the first bounding box and the second bounding box refer to the object as the same object, wherein the parameter is either (i) a distance of the object from the vehicle or (ii) a class of the object.

2. The non-transitory machine-readable storage medium of claim 1, the instructions to further cause operations to:
   identify the object from the camera data, wherein the camera data comprises at least one two-dimensional image that indicates the identified object in the environment.

3. The non-transitory machine-readable storage medium of claim 2, wherein the first bounding box is created from the camera data using a plurality of features corresponding to the identified object.

4. The non-transitory machine-readable storage medium of claim 1, the instructions to further cause operations to:
identify the object from the lidar data, wherein the lidar data comprises at least one three-dimensional point cloud that indicates the depth information of the identified object in the environment.

5. The non-transitory machine-readable storage medium of claim 4, wherein the second bounding box is created from the lidar data using the depth information of the identified object.

6. The non-transitory machine-readable storage medium of claim 1, the instructions to further cause operations to:
determine the class of the object;
wherein the fused bounding shape of the object is based on the class of the object.

7. The non-transitory machine-readable storage medium of claim 1, wherein the object is another vehicle or a pedestrian.

8. The non-transitory machine-readable storage medium of claim 1, wherein the fusion of the first bounding box and the second bounding box is further based on a distance of the object from the vehicle.

9. The non-transitory machine-readable storage medium of claim 1, wherein the fusion of the first bounding box and the second bounding box is further based on intersection-over-union (IOU) between the first bounding box and the second bounding box.

10. The non-transitory machine-readable storage medium of claim 1, wherein the sensor data further includes radar data that is captured from a radar system of the vehicle, and wherein the fused bounding shape of the object is further based on corresponding radar objects detected from the radar data.

11. A computing device, comprising:
at least one interface to receive sensor data representative of an environment of a vehicle, the sensor data including: camera data providing at least one image of an object in the environment, and lidar data providing depth information of the object in the environment; and
at least one processor configured to perform operations to:
synchronize the sensor data based on timestamps indicating time of capture for the camera data and the lidar data;
define, from the camera data obtained at the time of capture, a first bounding box for the object;
define, from the lidar data obtained at the time of capture, a second bounding box for the object; and
fuse, based at least partially on a parameter, the first bounding box and second bounding box to define a fused bounding shape of the object, wherein fusion of the first bounding box and second bounding box is based on a confidence value that the first bounding box and the second bounding box refer to the object as the same object, wherein the parameter is either (i) a distance of the object from the vehicle or (ii) a class of the object.

12. The computing device of claim 11, the at least one processor further configured to perform operations to:
identify the object from the camera data, wherein the camera data comprises at least one two-dimensional image that indicates the identified object in the environment.

13. The computing device of claim 12, wherein the first bounding box is created from the camera data using a plurality of features corresponding to the identified object.

14. The computing device of claim 11, the at least one processor further configured to perform operations to:
identify the object from the lidar data, wherein the lidar data comprises at least one three-dimensional point cloud that indicates the depth information of the identified object in the environment.

15. The computing device of claim 14, wherein the second bounding box is created from the lidar data using the depth information of the identified object.

16. The computing device of claim 11, the at least one processor further configured to perform operations to:
determine the class of the object;
wherein the fused bounding shape of the object is based on the class of the object.

17. The computing device of claim 11, wherein the object is another vehicle or a pedestrian.

18. The computing device of claim 11, wherein the fusion of the first bounding box and the second bounding box is further based on a distance of the object from the vehicle.

19. The computing device of claim 11, wherein the fusion of the first bounding box and the second bounding box is further based on intersection-over-union (IOU) between the first bounding box and the second bounding box.

20. The computing device of claim 11, wherein the sensor data further includes radar data that is captured from a radar system of the vehicle, and wherein the fused bounding shape of the object is further based on corresponding radar objects detected from the radar data.

* * * * *